Dec. 14, 1971 E. PLUMAT 3,626,723
PRODUCTION OF CHEMICALLY STRENGTHENED CURVED GLASS BODIES
Filed April 18, 1968 2 Sheets-Sheet 1

INVENTOR
Emile Plumat

BY Spencer & Kaye

ATTORNEYS

Dec. 14, 1971  E. PLUMAT  3,626,723
PRODUCTION OF CHEMICALLY STRENGTHENED CURVED GLASS BODIES
Filed April 18, 1968  2 Sheets-Sheet 2

INVENTOR
Emile Plumat

BY Spencer & Kaye

ATTORNEYS

United States Patent Office 3,626,723
Patented Dec. 14, 1971

3,626,723
PRODUCTION OF CHEMICALLY STRENGTHENED
CURVED GLASS BODIES
Emile Plumat, Gilly, Belgium, assignor to Glaverbel S.A.,
Watermael-Boitsfort, Belgium
Filed Apr. 18, 1968, Ser. No. 722,359
Claims priority, application Luxembourg, Apr. 28, 1967,
53,550
Int. Cl. C03c 21/00
U.S. Cl. 65—30                                      18 Claims

ABSTRACT OF THE DISCLOSURE

A procedure for forming curved, tempered glass sheets by chemically tempering the sheets by means of a diffusion process and then bending the sheets to the desired curved form while the sheets are at a raised temperature which gives them a viscosity of no less than $10^{10}$ poises, whereby the sheets can be bent after tempering without having to be subjected to extremely high temperatures.

BACKGROUND OF THE INVENTION

The present invention relates to the production of curved glass bodies, and particularly to the production of curved tempered sheets by bending initially flat sheets, or sheets initially already curved to some extent.

Curved sheets of tempered glass find a wide variety of industrial and commercial applications, particularly in the automobile industry where they are required for vehicle windshields as well as for the other windows of many automobile models.

The known processes for producing curved tempered sheets involve first bending the glass at a high temperature and then toughening the glass by a heat treatment known as thermal tempering. Such tempering treatment must be carried out after the glass has been bent because the glass can not possibly be bent after it has been thermally tempered. On the other hand, such thermal tempering treatments, particularly when they are performed on curved glass sheets, are likely to cause a deformation of the glass sheets or to cause their optical properties to be impaired.

SUMMARY OF THE INVENTION

It is a primary object of the present invention to overcome these drawbacks and difficulties.

Another object of the invention is to improve the production of tempered, curved glass bodies.

Still another object of the invention is to eliminate the necessity for bringing the bodies to a high temperature in order to bend them.

Yet a further object of the invention is to permit the bodies to be bent after they have been tempered.

These and other objects according to the invention are achieved by a method for producing a curved, tempered glass body by chemically tempering the body by means of a diffusion process and then applying bending forces to the body while maintaining the body at a temperature which gives it a viscosity of no less than $10^{10}$ poises for producing the desired curved configuration.

The objects according to the invention are also achieved by the provision of apparatus for producing bent and tempered bodies of glass, which apparatus includes means for bending a body of glass to a predetermined shape, a container for holding the diffusion bath of molten salt, means for supporting the body of glass in the container so that chemical tempering of the glass can take place therein, means associated with the bending means for bringing the temperature of the glass, when the glass is under the control of the bending means, to such a value so that its viscosity is no less than $10^{10}$ poises, and means associated with the bending means for exerting forces on such body of glass to bend it to a predetermined shape while the viscosity of the glass is maintained at such a value.

The present invention is the result of several rather surprising discoveries. Firstly, I have discovered that, whereas a body of glass cannot be satisfactorily bent after having been thermally tempered, such glass can be quite satisfactorily bent after having been chemically tempered. Moreover, it is not necessary to heat the glass to a substantially high temperature for effecting such a bending operation.

Moreover, I have discovered that chemical tempering actually facilitates the bending of the glass in that it permits the glass to be bent more rapidly than untempered glass.

I have also found that, in the practice of the present invention, the bending operation can be performed while the chemical tempering process is proceeding.

The fact that the entire tempering and bending process according to the invention can be performed at temperatures which are lower than those which are necessary for the performance of thermal tempering processes is of great importance when it is desired to produce high quality glass products. Specifically, it has been found that the mechanical strength of the glass is improved by the lower temperature treatment.

Furthermore, the lower temperatures employed in processes according to the invention have the advantage of reducing the requirements on the various glass shaping and handling members. In effect, the tools required for supporting bent glass sheets during thermal tempering processes are expensive because these tools must be capable of withstanding the high temperatures at which the thermal tempering processes are carried out and of maintaining a high mechanical strength at those temperatures.

Moreover, substantial difficulties arise in the prior art bending processes due to the tendency of the glass, due to the high temperature at which it is maintained, to adhere to the shaping surfaces. It has heretofore been proposed to insert special materials between the glass and the shaping surfaces in order to not only reduce such adherence, but also to prevent the surfaces from making impressions in the glass. However, these procedures have not proven adequate and are rendered completely unnecessary by the low temperatures employed for the practice of the present invention.

BRIEF DESCRIPTION OF THE DRAWINGS

FIG. 2 is a cross-sectional plan view taken along the line 2—2 of FIG. 1a.

DESCRIPTION OF THE PREFERRED EMBODIMENTS

Figure 1A:
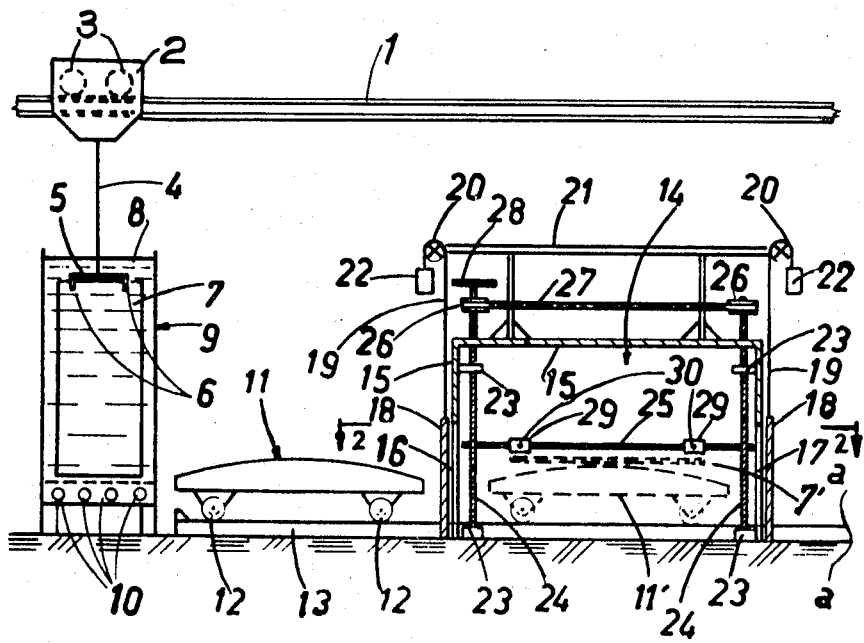
FIGS. 1a and 1b are an elevational view in two parts of one embodiment of the apparatus according to the present invention.

The present invention basically involves methods and apparatus for permanently deforming a sheet of glass by applying mechanical bending forces to the sheets during and/or after the glass has been chemically tempered and while the viscosity of the glass is not less than $10^{10}$ poises.

The term "sheet" as employed herein includes any piece of glass of whatever size or part of a continuously formed ribbon of glass. It is preferred, according to the present invention, that the viscosity of the glass be maintained between $10^{10}$ and $10^{15}$ poises for the bending operation, which viscosity range will be referred to as the "transformation range." The principles of the present invention are also applicable to bending operations in which the viscosity of the glass is above this transformation range, but in such cases the time necessary for permanently bending the glass sheet will be substantially longer, the time required increasing as the temperature of the sheet decreases.

Furthermore, it has been determined that the preferred range of viscosities which the glass should have when subjected to the bending forces is between $10^{11.5}$ and $10^{14.5}$ poises.

The invention is primarily, but not exclusively, concerned with the bending of drawn sheet glass of ordinary composition, for example ordinary soda-lime glass. The transformation range for such glasses corresponds approximately to the temperature range of 600° C.–400° C. However, the invention can also be utilized for bending other glasses such as lithium silicate glasses, and more complex glasses such as lithium silico-aluminate glases, all of which can be chemically tempered by substituting sodium and/or potassium ions for the lithium ions originally present in the surface layers of the glass.

Any type of chemical tempering operation can be employed in the performance of the present invention. Thus, the chemical tempering operation may be one wherein the ions initially in the glass are replaced either by smaller ions or by larger ions. Ions initially in the glass can be replaced by smaller ions from the treating medium when the temperature of the glass is maintained above its strain point (corresponding to a viscosity of $10^{14.6}$ poises). In those cases, the viscosity of the glass can be either above or below $10^{14.6}$ poises during the bending operation, the viscosity then preferably being the range of $10^{10}$–$10^{15}$ poises.

If the ions initially in the glass are replaced by larger ions, for example if sodium ions are replaced by potassium ions, or if lithium ions are replaced by sodium and/or potassium ions, lower temperatures are required. In these cases, where the ions in the glass are replaced by larger ions, it is preferred that the diffusion process be carried out while the viscosity of the glass is above $10^{13.2}$ poises and the bending of the sheet should also be carried out while maintaining the viscosity of the sheet above $10^{13.2}$ poises. However, if it is desired that the bending of the sheet be performed rapidly, the viscosity of the sheet should not exceed $10^{15}$ poises; in other words, the viscosity of the sheet should then be between $10^{13.2}$ and $10^{15}$ poises.

The ion substitution may be effectuated by maintaining the glass at a suitable temperature in a bath defined by a liquid medium which includes a salt for producing the ion exchange, the salt either being dissolved or in a molten condition. To cite a specific example, a soda-lime silicate sheet glass can be chemically tempered in a bath of molten potassium salt at a temperature near the lower end of the transformation range, for example 500° C. or less, sodium ions initially at the surface of the glass being replaced by much larger potassium ions.

Alternatively, diffusion of ions into the glass may take place from a gaseous medium in contact with the glass, for example an atmosphere of hydrogen or superheated steam, or from a relatively viscous medium applied to the glass to form a layer on at least one side thereof, for example a layer consisting essentially of carbon or a metal such as silver, tin or lead, or a layer of a molten salt having a composition such that ion exchange takes place between the glass and the coating layer. Any medium used to provide the ions which are to diffuse into the glass and which is adherent to the glass after the chemical tempering process can be left on the glass as a coating or can be removed.

Whatever may be the value for the coefficient of diffusion between the medium and the glass for a particular process, this value increases with increase in temperature. For example, the coefficient of diffusion of potassium into a soda-lime glass is ten times higher at 500° than at 400° C. There are advantages, therefore, in keeping the temperature at or near the upper end of the temperature range which has been determined to be permissible for the selected type of chemical tempering process.

To cite one example, the mechanical tensile strength of a sheet of soda-lime silicate glass, which was initially 5–10 kg./mm.², was increased in a few moments to a value of 100–150 kg./mm.² when subjected to chemical tempering in a bath of one or more potassium salts at a temperature just below 500° C. After its strength has been so increased, considerable bending forces can be applied to the glass, if its viscosity is maintained within the transformation range, without breaking the glass.

The bending of the glass can occur at any stage after its surface layers have been mechanically strengthened by chemical tempering, and if the glass has been allowed to cool following this tempering, its temperature can be raised to a suitable value preparatory to bending in any desired manner, for example, in a furnace or by immersing the sheet in another heated bath. The time interval between the tempering and bending operations can be as long as may be required, but it is preferable to reheat the glass for bending sufficiently rapidly to avoid any chance of stress relaxation occurring.

The glass sheet can be bent while it is still immersed in a chemical tempering bath maintained at an appropriate temperature.

The amount of chemical tempering which should take place before the bending forces are applied depends on the magnitude of such forces and thus on the thickness of the sheet of glass and on the degree to which it is to be bent. It is possible to carry out some bending operations after only a shallow tempering, for instance to a depth of the order of a few microns. If this shallow tempering does not impart sufficient mechanical strength to meet the requirements for the ultimate use of the glass sheet, then further chemical tempering can be carried out after the sheet has been bent and this further treatment may last as long as is necessary for imparting the requisite mechanical strength to the glass.

Certain advantages are gained by performing the first stage tempering at a temperature at or near the upper end of the permissible temperature range for the selected chemical tempering process, and the second stage tempering, after the sheet has been bent, at a lower temperature. By keeping the temperature lower during the second tempering stage, there is less tendency for stress relaxation to occur than at the higher temperature of the first stage tempering, while the higher temperature is itself desirable during the first stage so that the mechanical strength of the glass can be quickly increased to a value which is advantageous for the bending of the glass. As an example, a first stage tempering involving the replacement of ions in the glass by larger ions can be performed below, but near to, the temperature at which the viscosity of the glass is $10^{13.2}$ poises, and after the glass has been bent, a second stage tempering can be performed at a lower temperature. In the case of a soda-lime glass with an annealing point of about 500° C., the first stage tempering can be performed at a temperature just below 500° C. and the second stage tempering can be performed in the region of 450° C.

The bending forces can be applied, for example, by pressing the sheet between two shaping molds, or by subjecting the periphery of the sheet to pressure while the sheet is supported on a shaped die. In designing the mold components or other forming members, a correctional coefficient should preferably be applied to allow for residual elasticity, or recovery, of the bent glass and thus to avoid unduly long treatments. The effect of residual elasticity varies in dependence on temperature, the orders of magnitude of the corrections to be applied in designing and preparing molds varying between 5 and 10% in dependence on temperature.

If no such correction factor is introduced, the sheet must be held in the desired configuration at the elevated temperature for an appreciably longer time. For example, if a correction of 10% is employed, the length of time during which the sheet is held in the mold can be about two-thirds of the time required if no correction factor is utilized.

The present invention includes apparatus for carrying out the novel glass manufacturing process. This apparatus essentially includes means for bending a glass sheet to a predetermined shape, means associated with the bending means for exerting bending forces on such glass sheet so as to bend it to the predetermined shape, a container for holding a diffusion bath of molten salt, and means for supporting the glass sheet in the container so as to permit chemical tempering of the glass to occur. According to a simplified form of construction of such apparatus, the supporting means is directly associated with the bending means so as to permit the glass to be immersed in the diffusion bath while being under the control of the bending means.

The container may be equipped with means for maintaining the bath in a molten condition, or the container can be located in a furnace.

The sheet supporting means may consist, for example, of two mating dies or of a single die on which the sheet will rest and a pressing element arranged to cooperate with the die.

Several embodiments of apparatus according to the invention are shown in the accompanying drawings.

Figure 1B:
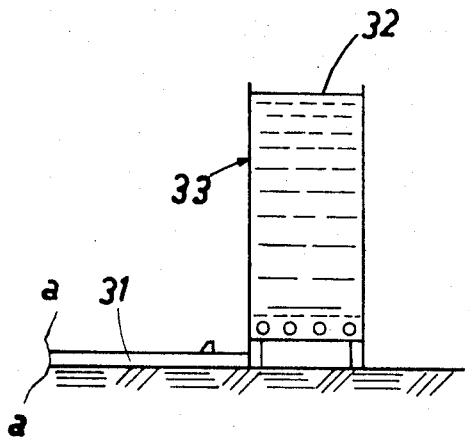
Figure 2:
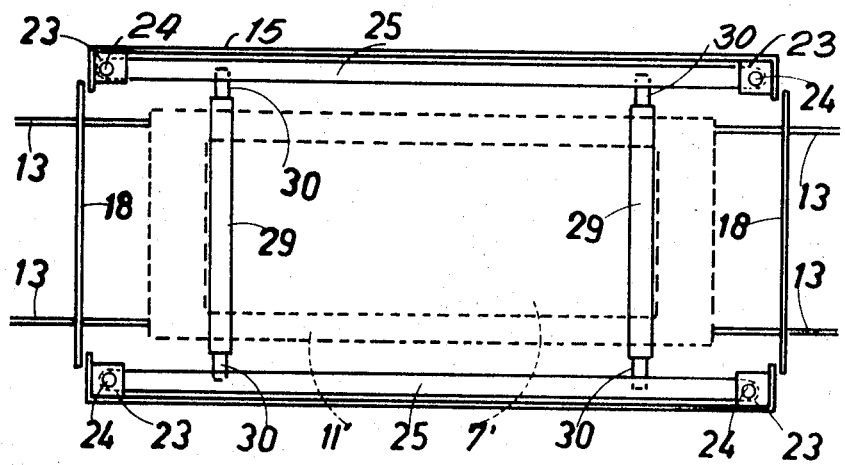

The apparatus shown in FIGS. 1a, 1b and 2 includes a monorail track 1 along which a trolley 2 rides, the trolley being provided with rollers 3, or wheels, which travel upon the track 1. The trolley may be moved by an electric motor mounted to directly drive the wheels 3 or by a cable or chain. A cable 4 associated with the trolley carries a rocking lever 5 having tongs 6 for supporting a sheet of glass 7 in a diffusion bath 8 of salt, for instance potassium nitrate, contained in a tank 9 which is heated by electrical resistors 10.

After a suitable immersion period, during which the sheet is at least partially chemically tempered, the sheet 7 is lifted out of the bath, transported along rail 1 for a short distance, and laid flat on a die 11 mounted on wheels 12 which run on rails 13. This die, after a chemically tempered glass sheet has been placed thereon, can be pushed into a furnace 14, in which the die and glass sheet are shown in broken lines and designated 11' and 7', respectively.

The furnace 14 is composed of an enclosure 15 with an inlet passage 16 and an outlet passage 17. Each of the passages 16 and 17 can be closed by a respective drop gate 18 suspended from a cable 19 which runs over a pulley 20 carried by a frame 21 and has a counterweight 22 attached to its other end.

Bearings 23 disposed at the four corners of the furnace, and each composed of an upper element and a lower element, support four screw-threaded rods 24. These rods are in screw-threaded engagement with horizontal bars 25 in the form of square-section tubes which can be raised or lowered by rotating the rods 24 in one direction or the other. The rods are connected by a roller chain 27 which passes around pinions 26 on the rods for causing all of the rods to be rotated in unison and the system is actuated by a wheel 28.

The furnace is preferably heated by suitable electrical resistance heaters (not shown), although any other type of heaters could be used. Horizontal, transverse pressing elements 29 are pivotally supported by and trunnions 30 between the bars 25, the trunnions being held in apertures in the bars 25. A series of such apertures is preferably provided to permit the positions of the pressing elements to be varied to suit glass sheets of different sizes.

When a glass sheet has been brought by die 11 into the furnace and has been heated to a suitable temperature, the bars 25 are lowered, by turning wheel 28, to bring the pressing elements 29 into contact with the end margins of the sheet. Then the bars 25 are further lowered gradually during a certain period of time so that the pressing elements press down on the ends of the sheet and progressively bend the sheet until it assumes the curvature of the die. The length of time taken for this bending operation depends, inter alia, on the temperature of the glass sheet.

Afterwards, the bars 25 and the pressing elements are raised and the die is advanced to the position 31 shown in FIG. 1b, where the curved sheet is removed from the die by means of the trolley 2 and immersed in a bath 32 of molten salt in a tank 33 for the purpose of further chemically tempering the glass.

Figure 3:
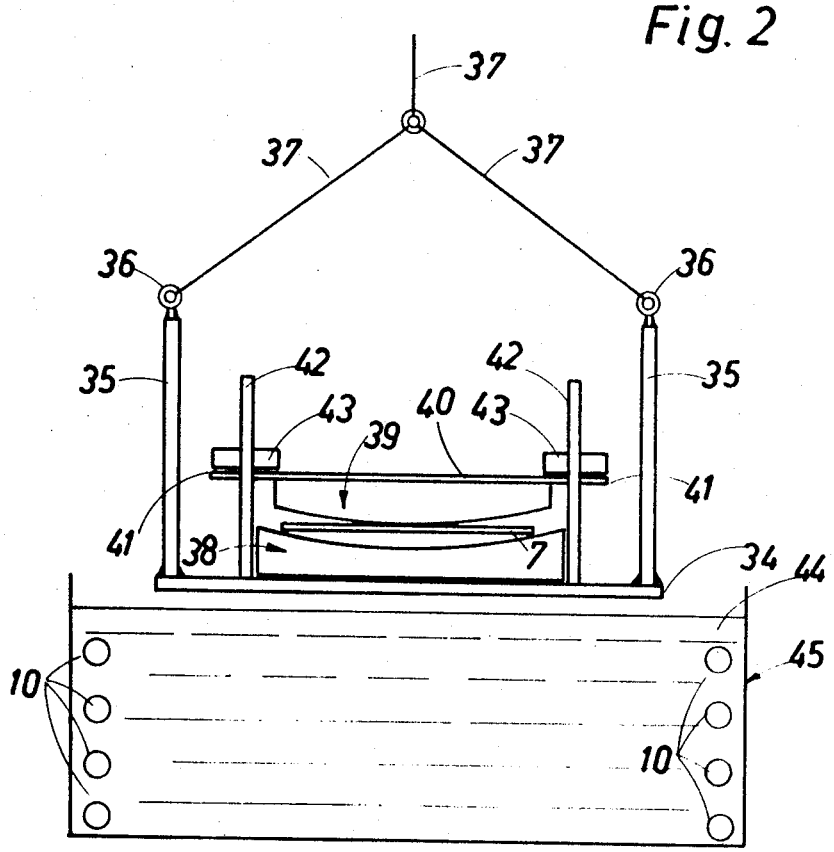
FIG. 3 is an elevational view of another embodiment of apparatus according to the invention.

An alternative apparatus shown in FIG. 3 includes a frame made up of a rectangular platform 34 having uprights 35 at its corners. These uprights are provided with top rings 36 enabling the apparatus to be suspended via cables 37 from a trolley similar to the one shown in FIG. 1a.

The platform 34 supports a lower concave die component 38. A cooperating convex die component 39 is carried by a plate 40 whose end portions 41 are provided with apertures through which extend vertical guide rods 42 carried by the platform 34. The apertures are dimensioned to permit the plate 40 to move easily relative to rods 42.

The apparatus shown in FIG. 3 is used in conjunction with a first chemical tempering tank comparable with the tank 9 of FIG. 1a. After a sheet of glass has been chemically tempered in such tank, the glass sheet is laid flat on the lower die component 38, as shown in FIG. 3, and the upper die component is allowed to rest on the sheet. Weights 43 are placed over the guide rods 42 and rest on the plate 40 so as to exert the required bending pressure.

The whole frame including the platform 34 and the supported dies is then lowered into a bath 44 of molten salt held in a tank 45. The salt is kept in a molten state at the temperature required for bending the glass by electrical resistance heaters 10. The dies and glass sheet are left submerged in the molten salt sufficiently long for the glass sheet to bend into conformity with the die surfaces.

The frame is subsequently raised and further chemical tempering of the glass takes place in a third bath, the sheet being retained between the dies.

The first chemical tempering bath can be dispensed with, thus substantially reducing the amount of apparatus required, if chemical tempering is allowed to take place in the bath 44 before the sheet is bent. To this end, the lower die component with the glass sheet thereon can be lowered into the bath and the upper die component can be placed in position after the requisite degree of chemical tempering has occurred. Chemical tempering subsequent to bending can also be performed in the same bath by simply removing the upper die component after the desired curvature has been imparted to the glass sheet and leaving the sheet in the bath for an additional period of time.

Cooperating die components of the type shown in FIG. 3 can equally well be used for bending a glass sheet in a furnace.

Several examplary processes according to the invention will now be described in detail.

EXAMPLE 1

The process according to the invention was applied for bending a glass sheet measuring 1 m. x 1 m. x 0.004 m. and having the following composition, the percentages being by weight:

| | Percent |
|---|---|
| $SiO_2$ | 70 |
| $Na_2O$ | 12 |
| $CaO$ | 10 |
| $MgO$ | 3 |
| $Fe_2O_3$ | Traces |
| $Al_2O_3$ | 5 |

The viscosities of such a glass at 510° C., 540° C. and 620° C. are $10^{15}$, $10^{13}$ and $10^{10}$ poises, respectively.

The glass sheet was chemically tempered by being immersed for 15 minutes, and at a temperature of 580° C., in a bath of molten salt composed of 58% NaCl, 40% NaNO₃ and 2% LiNO₃, the percentages being by weight.

After withdrawal of the glass sheet from the chemical tempering bath, its temperature was allowed to drop to 520° C. and a permanent curvature of 10%, this representing the ratio between the height of the arch formed by the curved sheet and the length of the sheet, was imparted to the sheet by gradually and progressively bending the sheet to this point over a period of five minutes. The same curvature can be produced at 450° C., but this requires that the bending forces be progressively applied over a period of half an hour.

EXAMPLE 2

A sheet of glass of the same size and composition as the sheet referred to in Example 1 was subjected to a chemical tempering process as stated in Example 1. Almost immediately after withdrawl of the sheet from the chemical tempering bath and while the sheet was at a temperature of 560° C., a permanent curvature of 10% was imparted to the sheet by progressively bending the sheet to this shape over a period of three minutes.

EXAMPLE 3

The process according to the invention was applied for bending a glass sheet measuring 0.2 x 0.5 x 0.003 m. and formed of a borosilicate glass of the following composition, the percentages being weight:

| | Percent |
|---|---|
| SiO₂ | 60 |
| Na₂O | 12 |
| CaO | 10 |
| MgO | 6 |
| B₂O₃ | 6 |
| Fe₂O₃ | 1 |
| Al₂O₃ | 5 |

The viscosities of such a glass at 450° C., 535° C. and 600° C. are $10^{15}$, $10^{13}$ and $10^{10}$ poises, respectively.

The glass sheet was chemically tempered by keeping it immersed for 30 minutes at a temperature of 480° C. in a bath of molten salt composed of 40% KNO₃, 30% KCl and 30% NaNO₃, the percentages being by weight.

At the end of the 30 minutes, bending forces were applied to the sheet, while it remained in the chemical tempering bath at a temperature of 480° C., so as progressively to bend the sheet to a curvature of 5%, the curvature being gradually produced over a period of 30 minutes.

By way of comparison, if a sheet of glass having a composition as set forth in any of the foregoing examples were to be bent to the extent indicated above and then thermally tempered, the glass would have to be bent prior to tempering and the temperature of the glass during the application of the bending forces would have to be above 620° C.

In the practice of the invention, particularly when the tempering bath is constituted by a salt solution, it is preferred that the bath be maintained under a pressure which is sufficient to prevent evaporation thereof at the process working temperature.

The dies, or sheet forming members, for use in a glass bending process according to the invention can be made from a variety of materials. In general, they need only withstand temperatures of up to 500° C. Various types of steel can be used. A good example is an austenitic 18/8 (18% nickel; 8% chromium) steel with a low carbon content (for instance 0.02%). However, a wide range of other suitable materials is available.

Since the low temperatures at which the operations according to the invention are carried out cause the effects of scaling due to oxidation to be considerably reduced, contact with the die surfaces will have very little harmful effect on the glass. At the lower temperatures employed, adhesion is no longer a problem, so that the interposition of a special material between the glass and the side surfaces can usually be dispensed with.

The most suitable temperature at which to bend the glass and the rate at which the glass is bent are subject to variation from case to case. For example, the bending time may be from a few seconds to a few hours, depending on the degree of deformation or the shape to be produced and on the properties of the glass sheet.

The following table gives a few test results illustrating the times necessary for producing permanent flexure of a sheet of glass measuring 1 m. x 1 m. x 0.004 m., and of the same composition as the glass used in Example 1 above, during immersion of the sheet in a bath of $K_2Cr_2O_7$. The bending forces were applied by a bar running parallel with two margins of the sheet while such margins were supported on two other bars extending along the length of the margins.

| Temperature, °C. | Flexing Moment (kgm) | Duration in minutes | Amount of resulting deformation, percent |
|---|---|---|---|
| 480 | 7.5 | 30 | 0.8 |
| 480 | 20.0 | 30 | 15.0 |
| 480 | 30.0 | 18 | 15.0 |
| 500 | 30.0 | 120 | 30.0 |

In all these examples, bending occurs at a temperature which is relatively low in comparison with the temperatures employed for the know processes. Some types of glass can be bent at very low temperature (e.g. about 250° C.) by the process according to the invention.

It is well known per se in the chemical glass tempering art that, for achieving the best results, the glass surfaces and/or edges should be subjected to some preliminary treatment to remove superficial flaws, and this practice can be followed when required, preparatory to proceeding according to the present invention. A suitable treatment, known per se, involves the use of a solution of hydrofluoric acid.

It will be understood that the above description of the present invention is susceptible to various modifications, changes and adaptations, and the same are intended to be comprehended within the meaning and range of equivalents of the appended claims.

What is claimed is:

1. A method for producing a permanently curved, chemically tempered glass body, comprising the steps of:
   placing a glass body initially containing exchangeable ions and of a type capable of being chemically tempered in contact with a diffusion medium constituting a source of ions of a different type than the exchangeable ions of the body;
   diffusing ions of such different type from the medium into the body in exchange for the exchangeable ions initially contained in the body under conditions which will result in the body becoming chemically tempered as a result of such diffusion; and
   applying bending forces to the body while maintaining it at a temperature which gives it a viscosity of no less than $10^{10}$ poises for producing the desired permanently curved configuration, at least a substantial part of said applying step being carried out after commencement of said diffusing step.

2. A method as defined in claim 1 wherein said step of applying bending forces is carried out while maintaining the body at a temperature whose value is such as to give the body a viscosity of between $10^{11.5}$ and $10^{14.5}$ poises.

3. A method as defined in claim 1 wherein said step of diffusing is carried out so as to produce compressive stresses in both surfaces of the body.

4. A method as defined in claim 3 wherein the medium is in the form of a liquid bath in which the body is immersed.

5. A method as defined in claim 4 wherein the liquid medium is a molten salt.

6. A method as defined in claim 4 wherein the bath is constituted by a salt solution and said step of diffusing tempering includes the operation of maintaining the bath under a pressure which is sufficient to prevent evaporation thereof at the temperatures at which the chemical tempering is carried out.

7. A method as defined in claim 1 wherein said step of diffusing is carried out while maintaining the glass at a temperature such that its viscosity is below $10^{14.6}$ poises and such that the diffusion process involves the replacement of ions originally in the surface layers of the glass by smaller ions.

8. A method as defined in claim 1 wherein said step of diffusing is carried out while maintaining the glass at a temperature such that its viscosity is greater than $10^{13.2}$ poises and such that the diffusion process involves the replacement of ions initially in the glass surface layers by larger ions, and wherein said step of applying bending forces is carried out sufficiently rapidly to prevent relaxation from occurring in the body.

9. A method as defined in claim 8 wherein said step of diffusing is carried out during at least part of said step of applying.

10. A method as defined in claim 8 wherein the diffusion process involves the substitution of potassium ions for smaller ions initially present in the glass.

11. A method as defined in claim 10 wherein the medium is composed at least partially of potassium nitrate.

12. A method as defined in claim 1 wherein said step of diffusing is carried out by immersing the body in a liquid medium which provides ions that diffuse into the glass, and said step of applying bending forces is carried out while the body is immersed in the liquid medium and the diffusion is proceeding.

13. A method as defined in claim 1 wherein said step of applying bending forces is carried out in a furnace.

14. A method as defined in claim 1 wherein said step of diffusing is carried out before said step of bending, and comprising the additional step of further chemcially tempering the glass after it has been bent to the desired curved configuration.

15. A method as defined in claim 14 wherein said step of further chemically tempering is carried out at a lower temperature than said step of chemically tempering.

16. A method as defined in claim 15 wherein said step of diffusing is carried out at a temperature below that at which the viscosity of the glass is $10^{13.2}$ poises and in such a way as to cause ions initially present in the glass to be replaced by larger ions.

17. A method as defined in claim 1 wherein said step of applying bending forces is carried out while the body is in contact with at least one suitably shaped die.

18. A method as defined in claim 1 wherein the glass is a soda-lime glass.

References Cited

UNITED STATES PATENTS

| | | | |
|---|---|---|---|
| 2,850,844 | 9/1958 | White | 65—287 |
| 2,943,963 | 7/1960 | Marini et al. | 65—287 X |
| 3,396,075 | 8/1968 | Morris | 65—30 X |

FOREIGN PATENTS

| | | | |
|---|---|---|---|
| 679,262 | 6/1966 | Belgium | 65—30 |

S. LEON BASHORE, Primary Examiner

J. H. HARMAN, Assistant Examiner

U.S. Cl. X.R.

65—114

UNITED STATES PATENT OFFICE
CERTIFICATE OF CORRECTION

Patent No. 3,626,723             Dated December 14th, 1971

Inventor(s) Emile Plumat

It is certified that error appears in the above-identified patent and that said Letters Patent are hereby corrected as shown below:

Column 1, line 8, after "53,550" insert --; Great Britain, Dec. 1, 1967, 54,763/67--. Column 7, line 22, change "withdrawl" to --withdrawal--; lines 50 and 51, correct the spelling of "progressively"; line 55, change "extent" to --extents--. Column 8, line 4, change "side" to --die--; line 31, change "know" to --known--; line 69, change "$10^{14.5}$" to --$10^{14.5}$--. Column 10, line 5, change "chemcially" to --chemically--.

Signed and sealed this 22nd day of August 1972.

(SEAL)
Attest:

EDWARD M. FLETCHER, JR.
Attesting Officer

ROBERT GOTTSCHALK
Commissioner of Patents